United States Patent
Miller et al.

(10) Patent No.: US 9,895,609 B2
(45) Date of Patent: Feb. 20, 2018

(54) SOCIAL SURFACING AND MESSAGING INTERACTIONS

(71) Applicant: Zynga Inc., San Francisco, CA (US)

(72) Inventors: Scott G. Miller, Austin, TX (US); Joseph Lopez, Austin, TX (US); Janus Anderson, Austin, TX (US); Sara Nelson, Austin, TX (US); Hernan Alamo, Austin, TX (US); Matthew Daniel Klepac, Pflugerville, TX (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 15/625,037

(22) Filed: Jun. 16, 2017

(65) Prior Publication Data
US 2017/0282065 A1   Oct. 5, 2017

Related U.S. Application Data

(63) Continuation of application No. 13/605,581, filed on Sep. 6, 2012, now Pat. No. 9,682,315.

(60) Provisional application No. 61/531,752, filed on Sep. 7, 2011.

(51) Int. Cl.
*A63F 13/30* (2014.01)
*A63F 13/335* (2014.01)

(52) U.S. Cl.
CPC .................. *A63F 13/335* (2014.09)

(58) Field of Classification Search
CPC ..................................... A63F 13/335
See application file for complete search history.

(56) References Cited

U.S. PATENT DOCUMENTS

| 5,970,479 | A | 10/1999 | Shepherd | |
|---|---|---|---|---|
| 6,042,477 | A * | 3/2000 | Addink | A63F 13/12 463/42 |
| 6,652,378 | B2 * | 11/2003 | Cannon | G07F 17/32 463/20 |
| 7,076,445 | B1 | 7/2006 | Cartwright | |
| 7,240,093 | B1 * | 7/2007 | Danieli | A63F 13/12 463/35 |
| 7,278,921 | B1 * | 10/2007 | Fujisawa | G06Q 40/04 463/42 |

(Continued)

OTHER PUBLICATIONS

"U.S. Appl. No. 13/605,581, Appeal Brief filed Oct. 10, 2016", 21 pgs.

(Continued)

*Primary Examiner* — David L Lewis
*Assistant Examiner* — Matthew D. Hoel
(74) *Attorney, Agent, or Firm* — Schwegman Lundberg & Woessner, P.A.

(57) ABSTRACT

This disclosure generally relates to systems and methods to provide interaction messages related to in-game activities and events within a computer-implemented multiplayer online game environment. In an example embodiment, potential interactions for a user's social connections are determined, and interaction messages detailing the potential interactions are generated and displayed for the user's social connections. In response to user activity with the interaction messages, various in-game events may be performed. In a further example, the interaction messages are provided and displayed directly through a "friendship" or "neighbor" bar providing a listing of in-game social connections.

25 Claims, 9 Drawing Sheets

(56) References Cited

U.S. PATENT DOCUMENTS

| | | | | |
|---|---|---|---|---|
| 7,311,608 | B1* | 12/2007 | Danieli | A63F 13/12 463/42 |
| 7,313,594 | B2* | 12/2007 | Murakami | G06Q 10/107 709/204 |
| 7,386,798 | B1* | 6/2008 | Heikes | G06Q 10/10 715/752 |
| 7,512,653 | B2* | 3/2009 | Krishnasamy | H04L 29/06 707/999.003 |
| 7,686,691 | B2* | 3/2010 | Van Luchene | G06Q 30/04 463/29 |
| 7,818,399 | B1 | 10/2010 | Ross, Jr. et al. | |
| 8,843,557 | B2* | 9/2014 | Ranade | G06Q 50/01 709/204 |
| 8,868,655 | B2* | 10/2014 | Ranade | H04L 67/38 463/25 |
| 8,881,181 | B1* | 11/2014 | Harrington | A63F 13/70 719/328 |
| 9,025,832 | B2* | 5/2015 | Latta | G06Q 10/10 382/115 |
| 9,682,315 | B1 | 6/2017 | Miller et al. | |
| 2004/0127289 | A1* | 7/2004 | Davis | A63F 13/12 463/42 |
| 2006/0135264 | A1* | 6/2006 | Shaw | A63F 13/795 463/42 |
| 2006/0247055 | A1* | 11/2006 | O'Kelley, II | A63F 13/12 463/42 |
| 2008/0119277 | A1* | 5/2008 | Thelen | G07F 17/32 463/42 |
| 2009/0082111 | A1* | 3/2009 | Smith | G06Q 30/02 463/42 |
| 2009/0149248 | A1* | 6/2009 | Busey | A63F 13/12 463/29 |
| 2011/0212784 | A1* | 9/2011 | Ocko | A63F 13/12 463/42 |
| 2011/0269546 | A1* | 11/2011 | Gill | H04L 67/38 463/42 |
| 2012/0311031 | A1* | 12/2012 | Latta | G06Q 10/10 709/204 |
| 2012/0322560 | A1* | 12/2012 | Joo | A63F 13/35 463/42 |
| 2013/0095857 | A1* | 4/2013 | Garcia | H04W 4/02 455/456.3 |

OTHER PUBLICATIONS

"U.S. Appl. No. 13/605,581, Corrected Notice of Allowance dated Apr. 13, 2017", 5 pgs.

"U.S. Appl. No. 13/605,581, Examiner Interview Summary dated Mar. 18, 2015", 3 pgs.

"U.S. Appl. No. 13/605,581, Final Office Action dated Mar. 24, 2016", 18 pgs.

"U.S. Appl. No. 13/605,581, Final Office Action dated May 8, 2015", 17 pgs.

"U.S. Appl. No. 13/605,581, Non Final Office Action dated Jan. 2, 2015", 16 pgs.

"U.S. Appl. No. 13/605,581, Non Final Office Action dated Sep. 25, 2015", 18 pgs.

"U.S. Appl. No. 13/605,581, Notice of Allowance dated Jan. 5, 2017", 12 pgs.

"U.S. Appl. No. 13/605,581, Response filed Jan. 26, 2016 to Non Final Office Action dated Sep. 25, 2015", 13 pgs.

"U.S. Appl. No. 13/605,581, Response filed Mar. 18, 2015 to Non Final Office Action dated Jan. 2, 2015", 15 pgs.

"U.S. Appl. No. 13/605,581, Response filed Aug. 10, 2015 sto Final Office Action dated Aug. 10, 2015", 17 pgs.

* cited by examiner

SOCIAL SURFACING AND MESSAGING INTERACTIONS

CLAIM OF PRIORITY

This application is a continuation of U.S. patent application Ser. No. 13/605,581, filed on Sep. 6, 2012, which claims the benefit of priority to U.S. Provisional Patent Application Ser. No. 61/531,752, filed Sep. 7, 2011, which applications are incorporated herein by reference in their entirety.

TECHNICAL FIELD

This disclosure generally relates to games and applications in general and in particular to computer-implemented online games, such as online role-playing games (RPGs), playable by more than one person from more than one location.

DESCRIPTION OF EXAMPLE EMBODIMENTS

Figure 1:
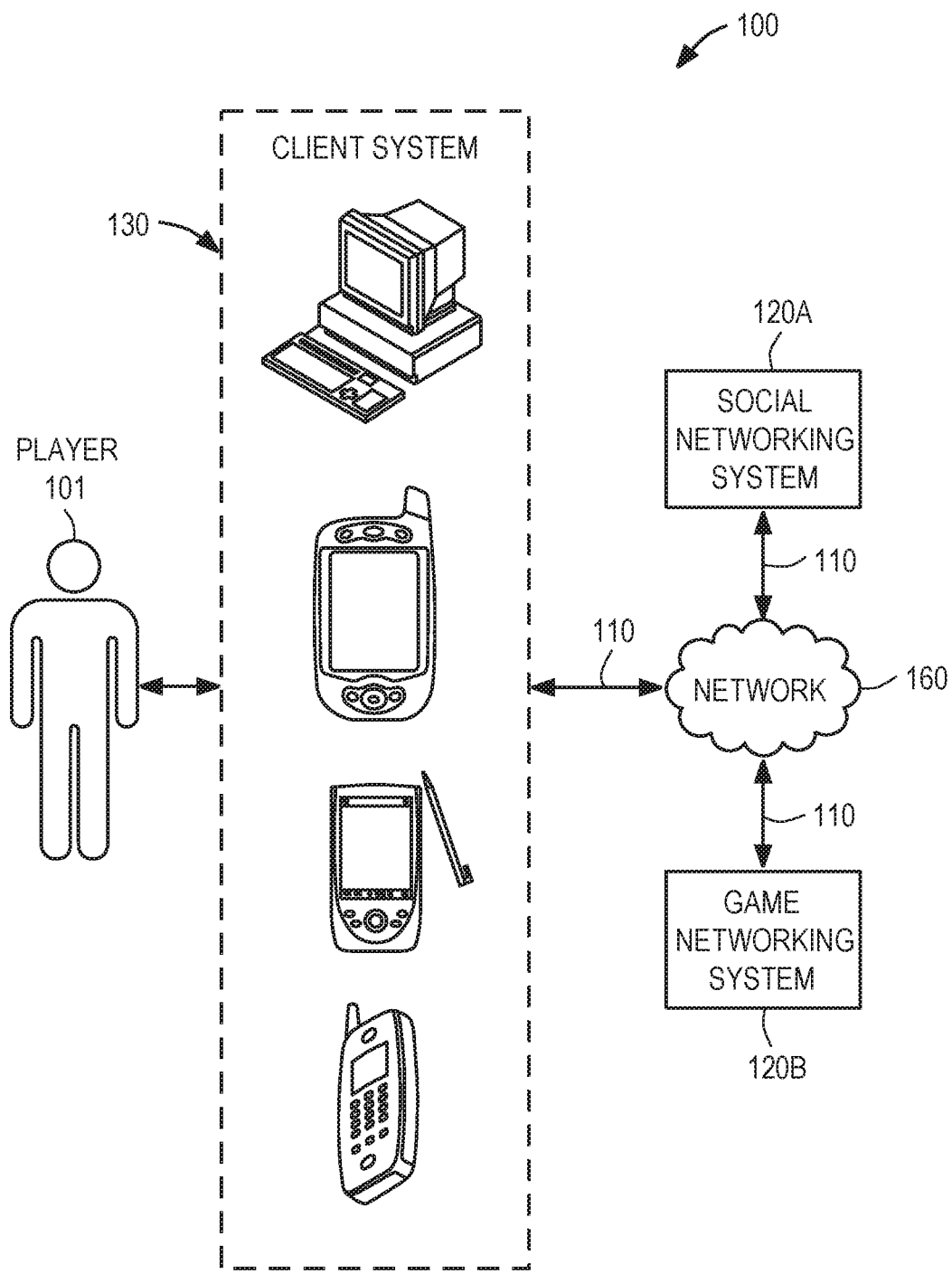
FIG. 1 illustrates an example of a system for implementing particular disclosed embodiments.

Various social surfacing and messaging interactions within game-related systems are disclosed herein. These interactions include user interface designs and interaction techniques designed to provide notifications to a player's socially connected "friends" regarding game play or game-related events in connection with the player. For example, an interaction message may be sent on behalf of a player who is performing a certain task in a game, to invite assistance from one of his or her friends to complete the game task. The interaction message may be automatically sent by a game engine configured to monitor game events, or the interaction message in some cases may be manually sent by a requesting player.

As further described herein, an interaction message that is sent to the player's friend or other social network connection and acted upon at an appropriate time, may encourage certain gaming activity in a virtual environment. This may result in a gaming outcome and social interaction between the users that might otherwise not occur without the interaction message. Such cooperative gaming activity and social interactions in the context of the gaming environment may further result in an improved user experience and additional game play by a socially connected set of users.

One of the example embodiments described herein provides players of a game with access to a message center user interface that communicates friend-related interaction messages and event notifications via one or more access points. This message center user interface may be implemented as a broad-based message display that collects or receives a variety of messages and notifications in a single location from a plurality of connected users, or a friend-specific message display that collects or receives a listing of messages and notifications specific to a single user. Such a friend-specific message display may be provided in connection with a listing of friends, such as a display ancillary to a "friend bar" graphical user interface that provides a representation of a number of friends using text or icons next to each other.

Each of the message center user interfaces may be configured to display only the most recent or most important messages and events. Further, the message display may be integrated into a gaming environment user interface to alert users as appropriate times, and allow friends to take immediate actions on particular game events in real-time or near real-time.

Any number of socially related game actions may be facilitated in connection with the messaging and interaction techniques described herein. These may be broadly categorized into action-related interaction message types (e.g., an invitation to join a game that details how a friend can use assistance in the game), or non-action related interaction message types (e.g., a notification of whether certain players are online, or what game accomplishments that the friend or a team has reached). Varying interaction message content relevant to the gaming or social environment may also be provided for display, such as friend status interaction messages indicating what activities a friend is currently performing in the gaming environment.

The term "interaction messages" as used herein is not intended to be limited to person-to-person or user-to-user messages, but may include a variety of type of interaction-based notifications sent from either the system or individual users, including invitations, requests, suggestions, alerts, and other notifications which may be broadcast to groups of users. The interaction messages further may have various time-based or activity-based properties and attributes (such as expiring from user view when the requesting user no longer needs help).

As will be apparent, the generation, display, and interaction with such interaction messages may drive a variety of social interactions within the gaming environment and any associated social mediums. The following describes example gaming and social network environments in which the presently described embodiments may be implemented, followed by implementation details of example systems and methods for social surfacing and messaging interactions.

Example Gaming Environment

In many online computer games, there is a virtual world or some other imagined playing space where a player of the game controls one or more player characters (herein "characters," "player characters," or "PCs"). Player characters can be considered in-game representations of the controlling player. As used herein, the terms player, user, entity, and friend may refer to the in-game player character controlled by that player, user, entity, or friend, unless context suggests otherwise. A game display can display a representation of the player character. A game engine accepts inputs from the player, determines player character actions, decides outcomes of events, and presents the player with a game display illuminating game play. In some games, there are multiple players, wherein each player controls one or more player characters.

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Safari, Internet Explorer).

FIG. 1 illustrates an example of a system for implementing various disclosed embodiments. In particular embodiments, system 100 comprises player 101, social networking system 140, game networking system 150, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 140 is a network-addressable computing system that can host one or more social graphs. Social networking system 140 can generate, store, receive, and transmit social networking data. Social networking system 140 can be accessed by the other components of system 100 either directly or via network 160. Game networking system 150 is a network-addressable computing system that can host one or more online games. Game networking system 150 can generate, store, receive, and transmit game-related data, such as, for example, game account data, game input, game state data, and game displays. Game networking system 150 can be accessed by the other components of system 100 either directly or via network 160. Player 101 may use client system 130 to access, send data to, and receive data from social networking system 140 and game networking system 150. Client system 130 can access social networking system 120 or game networking system 150 directly, via network 160, or via a third-party system. As an example and not by way of limitation, client system 130 may access game networking system 150 via social networking system 140. Client system 130 can be any suitable computing device, such as a personal computer, laptop, cellular phone, smart phone, computing tablet, or the like.

Although FIG. 1 illustrates a particular number of players 101, social networking systems 140, game networking systems 150, client systems 130, and networks 160, this disclosure contemplates any suitable number of players 101, social networking systems 140, game networking systems 150, client systems 130, and networks 160. As an example and not by way of limitation, system 100 may include one or more game networking systems 150 and no social networking systems 140. As another example and not by way of limitation, system 100 may include a system that comprises both social networking system 140 and game networking system 150. Moreover, although FIG. 1 illustrates a particular arrangement of player 101, social networking system 140, game networking system 150, client system 130, and network 160, this disclosure contemplates any suitable arrangement of player 101, social networking system 140, game networking system 150, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi, Worldwide Interoperability for Microwave Access (WiMAX), Long Term Evolution (LTE), or LTE-Advanced) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 140, game networking system 150, client system 130, and network 160, this disclosure contemplates any suitable connections between player 101, social networking system 140, game networking system 150, client system 130, and network 160. As an example and not by way of limitation, in particular embodiments, client system 130 may have a direct connection to social networking system 140 or game networking system 150, bypassing network 160.

Online Games and Game Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 150, which can be accessed using any suitable connection with a suitable client system 130. A player may have a game account on game networking system 150, wherein the game account can contain a variety of information associated with the player (e.g., the player's personal information, financial information, purchase history, player character state, game state). In some embodiments, a player may play multiple games on game networking system 150, which may maintain a single game account for the player with respect to all the games, or multiple individual game accounts for each game with respect to the player. In some embodiments, game networking system 150 can assign a unique identifier to each player 101 of an online game hosted on game networking system 150. Game networking system 150 can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 140, or game networking system 150). As an example and not by way of limitation, client system 130 can download client components of an online game, which are executed locally, while a remote game server, such as game networking system 150, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time that player 101 provides an input to the game through the client system 130 (such as, for example, by typing on the keyboard or clicking the mouse of client system 130), the client components of the game may transmit the player's input to game networking system 150.

Game Play

In particular embodiments, player 101 can engage in, or cause a player character controlled by him to engage in, one or more in-game actions. For a particular game, various types of in-game actions may be available to player 101. As an example and not by way of limitation, a player character in an online role-playing game may be able to interact with other player characters, build a virtual house, attack enemies, go on a quest, and go to a virtual store to buy/sell virtual items. As another example and not by way of limitation, a player character in an online poker game may be able to play at specific tables, place bets of virtual or legal currency for certain amounts, discard or hold certain cards, play or fold certain hands, and play in an online poker tournament.

In particular embodiments, player 101 may engage in an in-game action by providing one or more user inputs to client system 130. Various actions may require various types and numbers of user inputs. Some types of in-game actions may require a single user input. As an example and not by way of limitation, player 101 may be able to harvest a virtual crop by clicking on it once with a mouse. Some types of in-game actions may require multiple user inputs. As another example and not by way of limitation, player 101 may be able throw a virtual fireball at an in-game object by entering the following sequence on a keyboard: DOWN, DOWN and RIGHT, RIGHT, B. This disclosure contemplates engaging in in-game actions using any suitable number and type of user inputs.

In particular embodiments, player 101 can perform an in-game action on an in-game object. An in-game object is any interactive element of an online game. In-game objects may include, for example, PCs, NPCs, in-game assets and other virtual items, in-game obstacles, game elements, game features, and other in-game objects. This disclosure contemplates performing in-game actions on any suitable in-game objects. For a particular in-game object, various types of in-game actions may be available to player 101 based on the type of in-game object. As an example and not by way of limitation, if player 101 encounters a virtual bear, the game engine may give him the options of shooting the bear or petting the bear. Some in-game actions may be available for particular types of in-game objects but not other types. As an example and not by way of limitation, if player 101 encounters a virtual rock, the game engine may give him the option of moving the rock; however, unlike the virtual bear, the game engine may not allow player 101 to shoot or pet the virtual rock. Furthermore, for a particular in-game object, various types of in-game actions may be available to player 101 based on the game state of the in-game object. As an example and not by way of limitation, if player 101 encounters a virtual crop that was recently planted, the game engine may give him only the option of fertilizing the crop, but if player 101 returns to the virtual crop later when it is fully grown, the game engine may give him only the option of harvesting the crop.

In particular embodiments, the game engine may cause one or more game events to occur in the game. Game events may include, for example, a change in game state, an outcome of an engagement, a completion of an in-game obstacle, a transfer of an in-game asset or other virtual item, or a provision of access, rights and/or benefits. In particular embodiments, a game event is any change in game state. Similarly, any change in game state may be a game event. This disclosure contemplates any suitable type of game event. As an example and not by way of limitation, the game engine may cause a game event where the virtual world cycles between daytime and nighttime every 24 hours. As another example and not by way of limitation, the game engine may cause a game event where a new instance, level, or area of the game becomes available to player 101. As yet another example and not by way of limitation, the game engine may cause a game event where player 101's player character heals one hit point every 5 minutes.

In particular embodiments, a game event or change in game state may be an outcome of one or more in-game actions. The game engine can determine the outcome of a game event or a change in game state according to a variety of factors, such as, for example, game logic or rules, player character in-game actions, player character state, game state of one or more in-game objects, interactions of other player characters, or random calculations. As an example and not by way of limitation, player 101 may overcome an in-game obstacle and earn sufficient experience points to advance to the next level, thereby changing the game state of player 101's player character (it advances to the next character level). As another example and not by way of limitation, player 101 may defeat a particular boss NPC in a game instance, thereby causing a game event where the game instance is completed, and the player advances to a new game instance. As yet another example and not by way of limitation, player 101 may pick the lock on a virtual door to open it, thereby changing the game state of the door (it goes from closed to open) and causing a game event (the player can access a new area of the game).

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. As used herein, a player who is thus uniquely associated with a specific game instance, and to whom certain actions are exclusively available, is referred to as a "host player."

Such a game instance associated with a specific player may be accessible by one or more other players, either synchronously or asynchronously with the specific player's game play. As an example and not by way of limitation, a first player (i.e., the host player) may be associated with a first game instance, but the first game instance may be accessed by all first-degree friends in the first player's social network. As used herein, players thus accessing a game instance associated with another player are referred to as "guest players." In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game.

In particular embodiments, the set of in-game actions available to a specific player may be different in a game instance that is associated with that player (e.g., in which the player is a host player) compared to a game instance that is not associated with that player (e.g., in which the player is a guest player). The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

Social Graphs and Social Networking Systems

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure may apply to any suitable social graph users.

The minimum number of edges to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend."

Within the social graph, each player (or player character) has a social network. A player's social network includes all users in the social graph within Nmax degrees of the player, where Nmax is the maximum degree of separation allowed by the system managing the social graph (such as, for example, social networking system 140 or game networking system 150). In one embodiment, Nmax equals 1, such that the player's social network includes only first-degree friends. In another embodiment, Nmax is unlimited and the player's social network is coextensive with the social graph.

In particular embodiments, the social graph is managed by game networking system 150, which is managed by the game operator. In other embodiments, the social graph is part of a social networking system 140 managed by a third-party (e.g., Facebook, Friendster, MySpace, Google+). In yet other embodiments, player 101 has a social network on both game networking system 150 and social networking system 140, wherein player 101 can have a social network on the game networking system 150 that is a subset, superset, or independent of the player's social network on social networking system 140. In such combined systems, game networking system 150 can maintain social graph information with edge type attributes that indicate whether a given friend is an "in-game friend," an "out-of-game friend," or both. The various embodiments disclosed herein are operable when the social graph is managed by social networking system 140, game networking system 150, or both.

Figure 2:
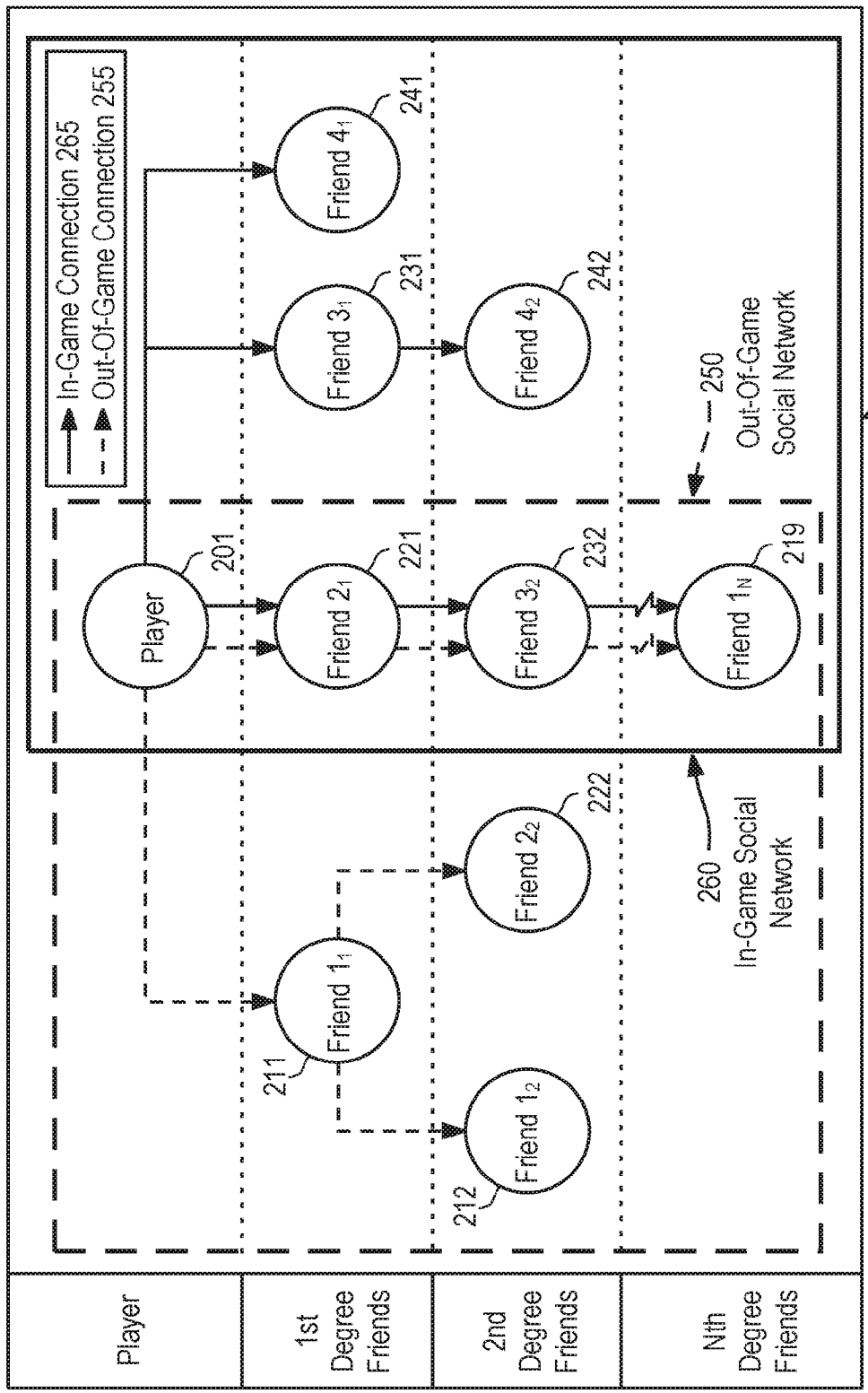
FIG. 2 illustrates an example social network.

FIG. 2 shows an example of a social network within a social graph 200. As shown, Player 201 can be associated, connected or linked to various other users, or "friends," within the social network 250. These associations, connections, or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend 11 211 and Friend 21 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend 12 212 and Friend 22 222 are connected to Player 201 via his first-degree Friend 11 211. The limit on the depth of friend connections, or the number of degrees of separation for associations, that Player 201 is allowed is typically dictated by the restrictions and policies implemented by social networking system 140.

In various embodiments, Player 201 can have Nth-degree friends connected to him through a chain of intermediary degree friends, as indicated in FIG. 2. For example, Nth-degree Friend 1N 219 is connected to Player 201 via second-degree Friend 32 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend 11 211 and Friend 21 221 are first-degree friends with Player 201 in his out-of-game social network 250. Player 201 also has in-game connections 265 to a plurality of players, forming in-game social network 260. Here, Friend 21 221, Friend 31 231, and Friend 41 241 are first-degree friends with Player 201 in his in-game social network 260. In some embodiments, it is possible for a friend to be in both the out-of-game social network 250 and the in-game social network 260. Here, Friend 21 221 has both an out-of-game connection 255 and an in-game connection 265 with Player 201, such that Friend 21 221 is in both Player 201's in-game social network 260 and Player 201's out-of-game social network 250.

As with other social networks, Player 201 can have second-degree and higher-degree friends in both his in-game and out-of-game social networks. In some embodiments, it is possible for Player 201 to have a friend connected to him both in his in-game and out-of-game social networks, wherein the friend is at different degrees of separation in each network. For example, if Friend 22 222 had a direct in-game connection with Player 201, Friend 22 222 would be a second-degree friend in Player 201's out-of-game social network 250, but a first-degree friend in Player 201's in-game social network 260. In particular embodiments, a game engine can access in-game social network 260, out-of-game social network 250, or both.

In particular embodiments, the connections in a player's in-game social network 260 can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

In multiplayer online games, two or more players can play in the same game instance. Game play is asynchronous when the players do not play simultaneously in the game instance. In particular embodiments, synchronous game play between two players in the same game instance can be simulated from asynchronous game play by recording the game play of a first player in the game instance at a first time and replaying that game play during the game play of a second player in the game instance at a later time. In particular embodiments, the game engine can record the in-game actions of a first player in a game instance for later play-back by other players in the game instance, and then the game engine loads and executes the previously recorded in-game actions during the game play of other players in the game instance.

Example System

Figure 3:
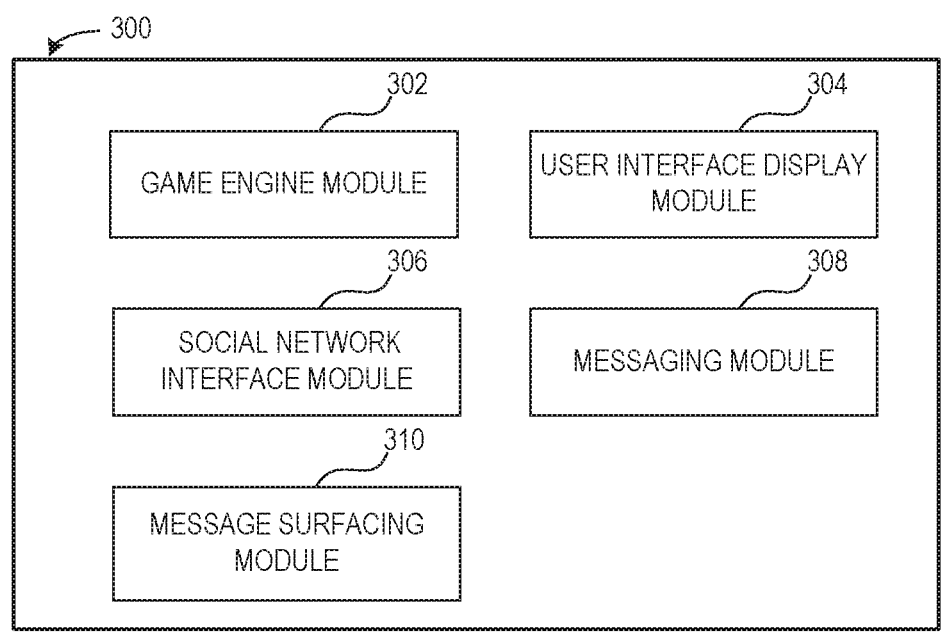
FIG. 3 illustrates an example system for implementing particular disclosed embodiments.

FIG. 3 illustrates an example system 300 for implementing particular disclosed embodiments. The system 300 may comprise a number of hardware-implemented modules provided by one or more processors. The system 300 may include a game engine module 302 to manage a multiplayer online game. To this end, the game engine module 302 may include game logic to manage in-game object and non-player character behavior, and to execute in-game actions responsive to user input. The game engine module 302 may interact with a user interface display module 304 to generate a user interface to display the game and game-related graphics and text, and accept user commands and input in connection with particular game instances and the gaming environment. A social network interface module 306 may be provided to access social networking information in connection with the game engine module 302 from a social networking system or a game networking system, for example, to determine a player's list of friends, in-game teammates, or "neighbors" to interact with in the online game, and to determine a player's list of friends, teammates, or neighbors to receive certain interaction messages in connection with the online game. A messaging module 308 may be provided to interface with the game engine module 302 and social network interface module 306 to generate, queue, and forward interaction messages to certain friends, teammates, or neighbors upon the occurrence of certain events or actions within the game or gaming environment. A message surfacing module 310 may be provided to interface with the user interface display module 304 to facilitate user interaction with various interaction messages provided to another user, for example, to enable a user to click on a interaction message "surfaced" in the game environment and launch a specific event in the user's or the requesting player's game. The message surfacing module 310 may be further provided to interface with the game engine module 302 such that certain game actions will occur in connection with the player or the requesting player's game when certain messages are displayed, accepted, rejected, or interacted with.

Functionality of the system 300 and its respective modules, in accordance with an example embodiment, is further described below with respect to example methods.

Example Methods

Figure 4:
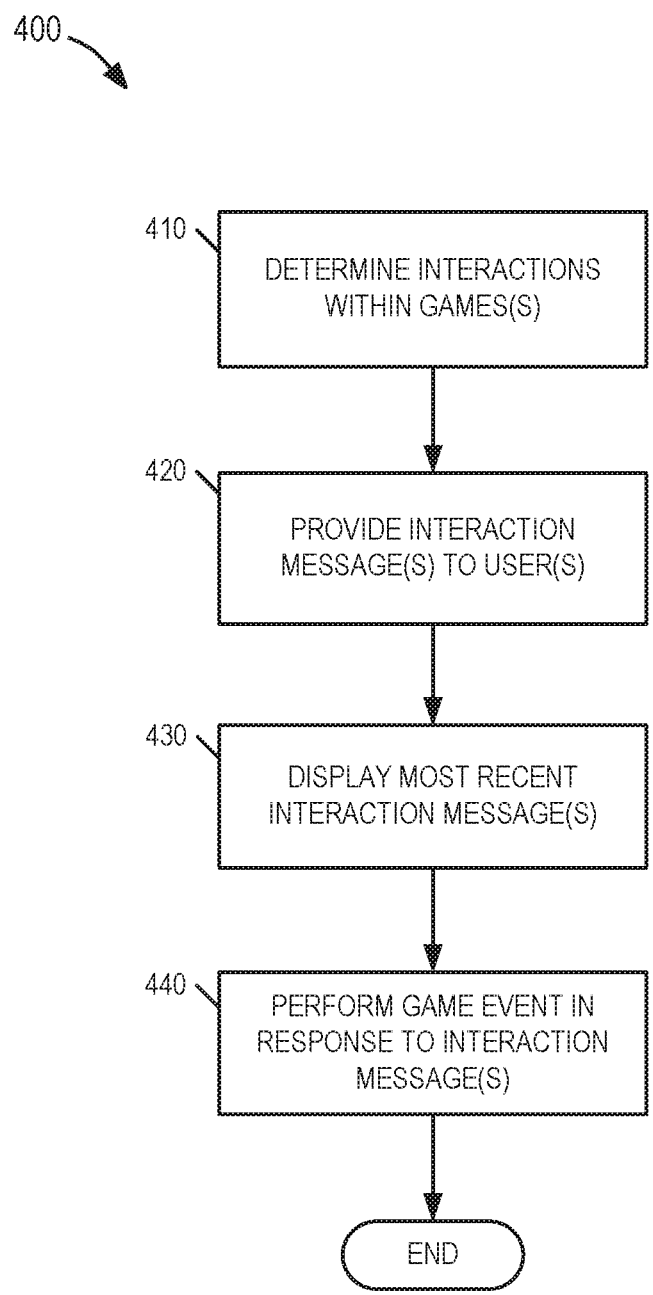
FIG. 4 illustrates an example method for implementing particular disclosed embodiments.

FIG. 4 illustrates a flowchart 400 of a high-level view of an example method to enable message surfacing and messaging social interactions with gaming users in various user interface displays, for example, in a display provided in connection with an instance of a multiplayer online game. The example method of the flowchart 400 may be implemented by the system 300 (FIG. 3).

The method of the flowchart 400 includes determining interactions within one or more games, gaming sessions, or gaming environments for user messaging at operation 410, for a "sending" user. This may include monitoring a status of a player in a particular game for when the sending user needs assistance, or monitoring event triggers that result in the transmission of interaction messages based on events in certain games. For example, when the sending user has lost a game "battle", an interaction message may be generated for one or more of the sending user's friends to alert that the sending user requires assistance for subsequent battles. This determination may also include factoring and selecting which user or sets of users (e.g., teammates or teams) are the most appropriate to receive an interaction message.

The method of flowchart 400 further includes providing the one or more determined interaction messages to one or more users ("receiving users") at operation 420. The textual and graphical content of interaction messages may be obtained from an information system, or be provided directly from the gaming environment. The one or more interaction messages are provided to the receiving users based on the determined interactions. The timing and initiation of the interaction messages may be automatically determined by a game engine or gaming logic, or manually requested by a sending user (for example, in response to a prompt such as "Do you want to ask Friends for help?").

The most recent interaction messages are displayed to receiving users at operation 430. As an example, the interaction messages may be displayed to a receiving user through alerts or status indicators provided on the receiving user's gaming environment screen, or in a common location such as a messaging center specific to a receiving user, sending user, game, or game social network. The display may provide one or more options (such as a selectable button) to perform interaction based on the interaction message. The display may also include one or more options to dismiss, hide, or otherwise move focus away from the interaction message.

Upon receiving a response to the one or more interaction messages from the receiving user, a game event may be performed at operation 440. This may include having the receiving user "join" an ongoing game session of the user, or provide the ability for the receiving user to conduct some game related interaction with the sending user (e.g., to send an in-game object to assist the sending user). Thus, a variety of game related actions may occur in connection with the in-game virtual environment of the game instance.

Example Interaction Messages and Interaction Message Displays

Interaction messages may be transmitted and displayed to a user in connection with a variety of the following example configurations and layouts. These configurations and layouts are merely provided for purposes of example, and not for limitation. Therefore, any number of user interface configurations in connection with or separately from a gaming environment may be used to facilitate the generation, display, and use of interaction messages.

As further described herein, an interaction messaging interface may facilitate a variety of interaction messaging use cases relevant to the specific gaming activity and social activity that occurs within a gaming environment. A variety of notifications or indicators may be used to indicate whether interaction messages are waiting or have been received from specific social connections (e.g., neighbors or teammates). If the social connections do not have any actionable events, then the indicator will be hidden from view.

In one example embodiment, a messaging center may provide a user with the ability to interact with numerous features of received interaction messages, including: enabling a user to open up the message center to view received messages from a plurality of users; see when specific friends have messages waiting to view, providing a view of messages relevant just to that friend; launch specific actions (e.g., by clicking on a button next to interaction message events) that require interaction to enable the user to participate directly in those events; and view the most recent or important interaction messages, to prevent the user from having to navigate through old or less-important information.

Figure 5:
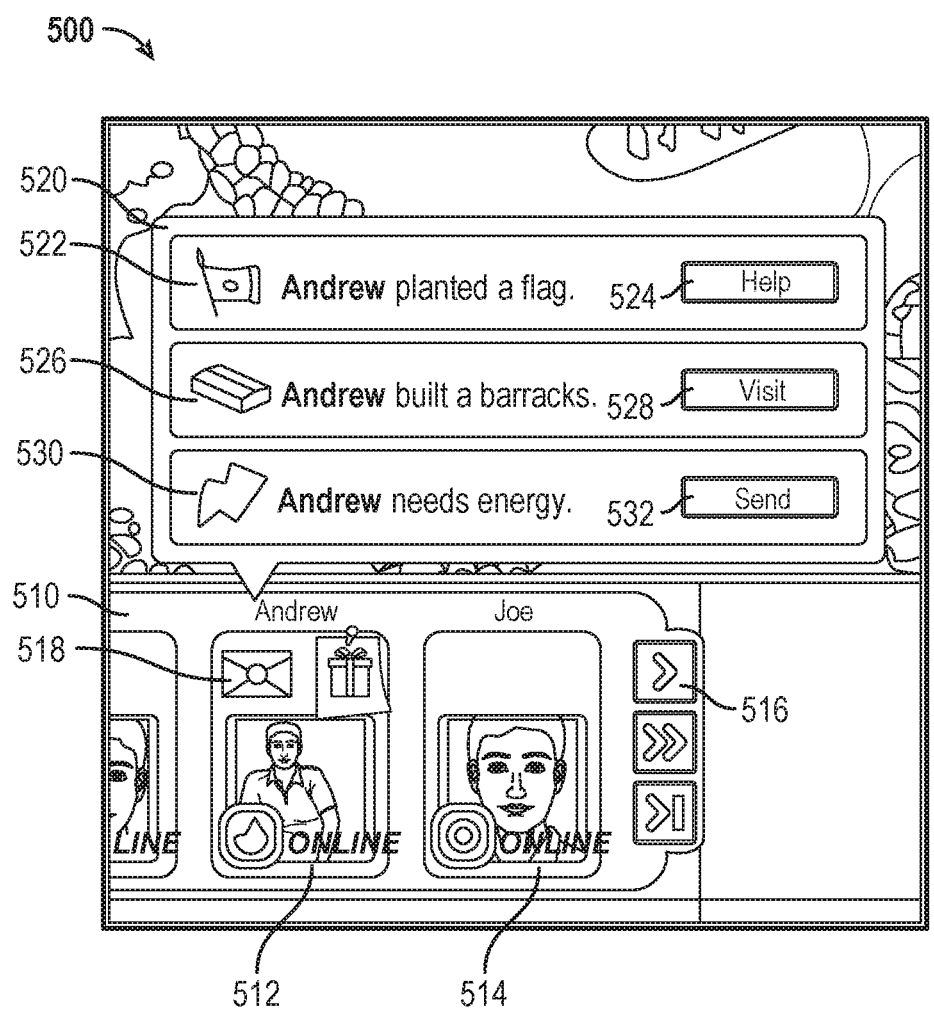
FIG. 5 illustrates an example layout of an interaction messaging interface for social surfacing and messaging interactions in connection with particular disclosed embodiments.
Figure 6:
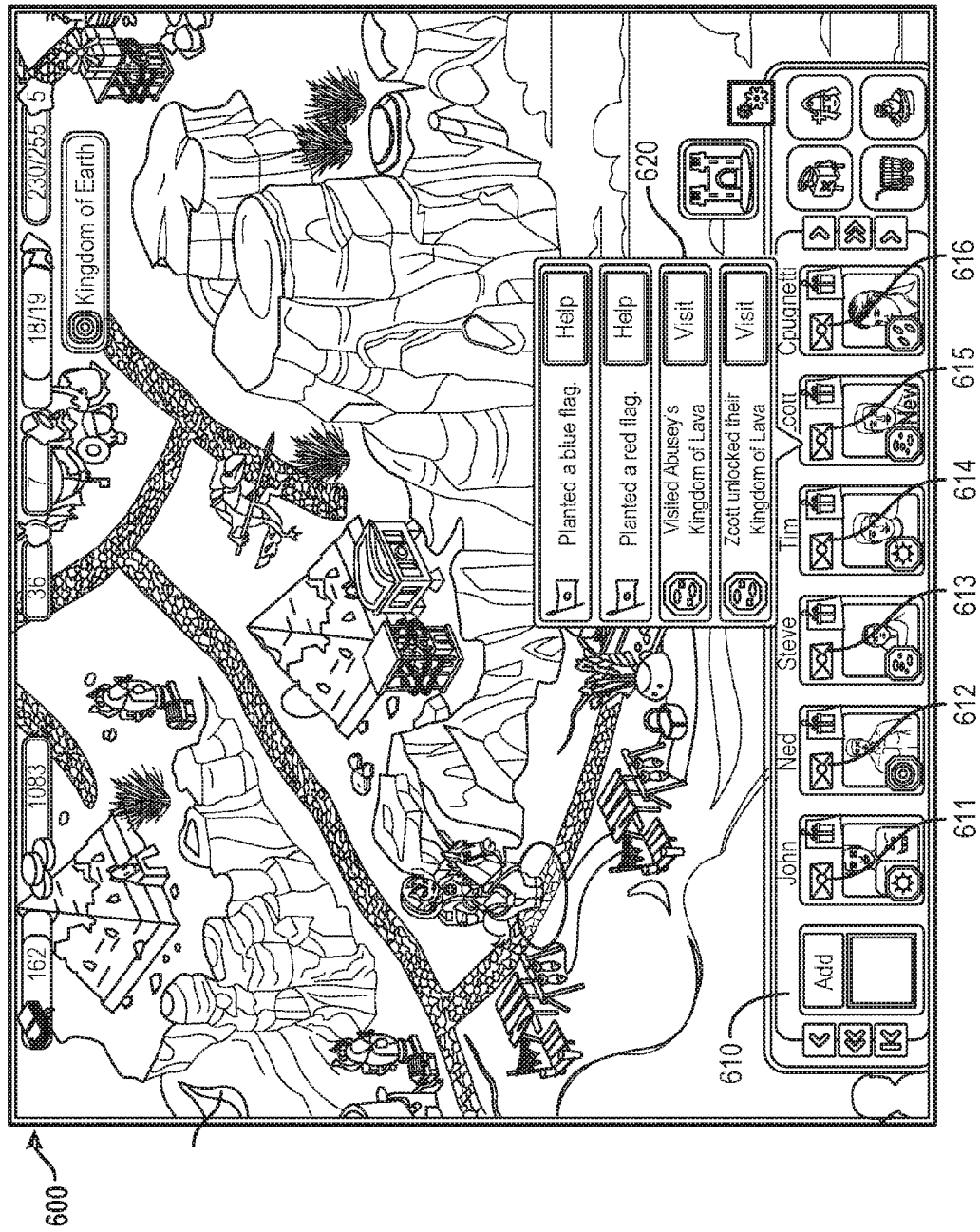
FIG. 6 illustrates an example interaction messaging interface for social surfacing and messaging interactions with multiple gaming social connections in connection with particular disclosed embodiments.
Figure 7:
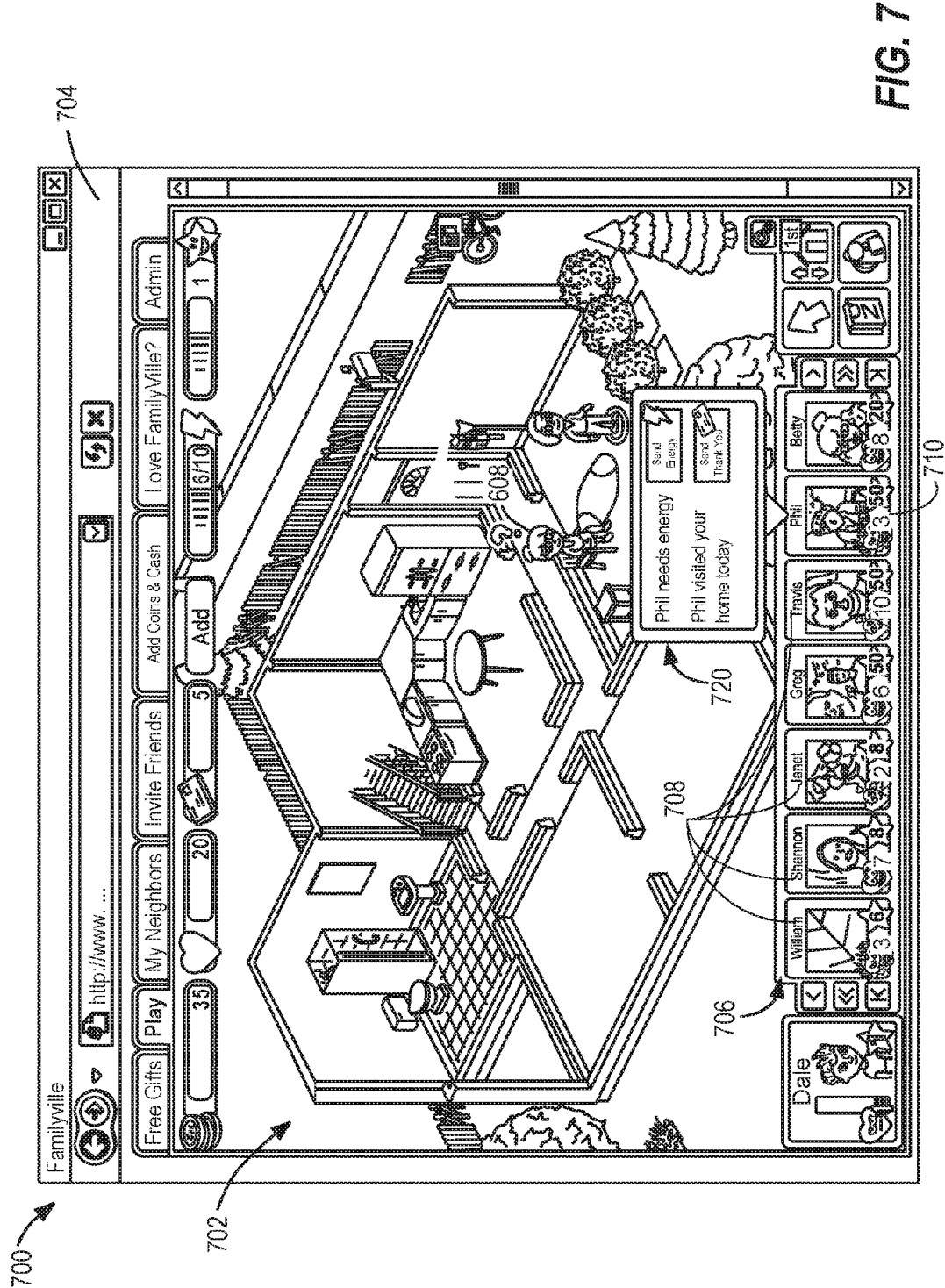
FIG. 7 illustrates an example interaction messaging interface overlaid on a game instance to connect with a particular game social connection in connection with particular disclosed embodiments.

In connection with the user interfaces illustrated in FIGS. 5, 6, and 7, and like suitable user interfaces, a variety of behaviors may be applied to the interaction messages and the display of interaction messages. For example, interaction messages may be configured to expire or be hidden from view after a defined period of time. For example, one configuration might only show game-related activity messages that happened in the last eight hours.

In one embodiment, two event classifications of social connection actions are provided by interaction messages: Non-Action Events and Action Events. Non-Action Events are generally basic events that inform a player that a friend did something/had something happen to them. For example, Player Jim repaired a farm, or reached a certain level in a game. Action Events further define events in which the messaged player can take an action. For example, Jim is building a farm, click here to help him out.

The display of action events interaction messages may have an associated button that lets the viewer click to go to the event, or otherwise conduct some suggested action. The player should be taken to wherever the action occurs (e.g., by launching a game and conducting the action in the virtual game). Non-action events, in contrast, may be accompanied by suggested actions not directly related to the in-game activity (e.g., "congratulate Jim", or "Visit his repaired farm."). Additionally, clicking on the action may clear the event from the queue for the message center.

Action and non-action events may be provided with a standard design that lets players know exactly what happened and to whom. Events should be described in succinct plain language in order to support localization substitution of text and graphics. Various social aspects and user information may be imported in connection with the display of the message. For example, when a message center is viewed in Full Screen mode, events should include the friend's profile picture and other navigation controls (e.g., visit friend, send message to friend) in order to facilitate social surfacing and other social interactions.

In one example embodiment, a message center may be provided in connection with one or both of the following views:

Message Center—Full Screen View—This view may cover all or the majority of displayed game environment surface and provide a consolidated list of all events that have occurred with friends. Various characteristics may be applied to the events. For example, the events may be listed in chronological order in descending order from most recent (i.e., ordered by recency). The message center may have a maximum limit on the number of active messages displayed at any time (such as provided from a defined variable). If a player has no events waiting the message center icon may be disabled.

Message Center—Mini View—This view may be invoked via the "neighbor bar" or "friend bar" that is visible during game play, and is configured to only display a sample of action events. Friends having interaction messages related to action events may display an indicator on their neighbor bar profile. The indicator may be displayed, for example, only when at least one action event for the friend is pending; otherwise the indicator is not shown.

The Mini View Message Center may provide a finite queue (from a defined variable) of available slots for Action Events, to provide a view of received interaction messages in a small screen space that does not interfere with game play or other activities on the screen space. For example, the Mini View may be restricted to displaying only four messages at a time. Other criterion may be used to limit the display of action event items. The Mini View may display the newest Action Events in descending order. Additionally, the queue may be restricted to all events that have occurred since the player's last play session (assuming the messages are still valid). Any Action Event clicked on in either the Full Screen or Mini views removes it from the queue for display in the Mini View.

Action events displayed in the Mini View may be configured to fit the window or overlay providing the Mini View. Action button text should relate to the action event. For example, an event about fighting in a game, may result in the display of button text="Go Fight!" Only the short message and a small icon or profile picture may be shown. Various notification display techniques may be provided to obtain the user's attention of the view. For example, the message center icon, link, or box may "glow" or change colors (or move, animate, or otherwise change) for a few seconds after a new message arrives.

The messaging center views disclosed herein may be triggered in a number of ways through in-game and out-of-game interaction, although a few specific examples follow. In one example, the messaging center may be triggered as a result of user interaction with an icon displayed on the game environment area (e.g., a game board). For example, this icon may be displayed on the game environment only when there are events pending for one or more friends. User selection of this icon may be used to launch a larger, full screen view of interaction messages.

Another example is provided in connection with the use of an icon located in a fixed location in the virtual game environment. The icon may provide an alternate look when messages are waiting. For example, this may be a Message Center "Building" in a virtual world location that is common or accessible to all users of the game (e.g., a "home" location in the virtual world, or a view that is displayed to all users upon conclusion of some game activity). This icon or location may be used as well to launch a larger, full screen view of interaction messages.

Another example is provided in connection with the use of an indicator directly displayed on one or more users illustrated with a "neighbor bar", iconic representation, or other listing of in-game neighbors, friends, or other gaming social connections provided by the gaming environment. For example, the message center may be indicated and launched through use of a small graphical indicator that appears on top of a specific friend icon or avatar. The graphical indicator may be used to indicate that the specific friend has an interaction message waiting (for example, for an action event interaction message to interact in a game with the specific friend).

FIG. 5 illustrates an example embodiment of a messaging center provided in connection with a display of a game instance in an online RPG. FIG. 5 specifically shows an example of a game-overlaid mini-view messaging interface 500 to display a limited number of interaction messages for a specific user.

As illustrated, a neighbor bar 510 may be used to provide a representation of a plurality of friends, social connections, or other players in which a connection exists in game or virtual environment, for example, player "Andrew" 512 and player "Joe" 514. The neighbor bar 510 may further provide navigation 516 to scroll through the neighbor bar 510.

An indicator icon 518 (here, an envelope) is used to provide an indication of interaction messages available for interaction with the particular user, player Andrew 512. Of note, no indicator icon is provided on the representation of player Joe 514, even though players Andrew 512 and Joe 514 are both indicated as being online in the game.

Upon interaction with the interaction message indicator icon 518 (e.g., clicking or moving a mouse cursor over the icon), a summarized messaging view window 520 is provided to the user as an overlay on the game. Each of the interaction messages provided in the summarized messaging view window 520 relates to the specific actions that user Andrew is performing in the game. These messages include: Message 522: "Andrew planted a flag", accompanied by selectable "Help" button 524 to assist the user in connection with the game play; Message 526: "Andrew built a barracks", accompanied by a selectable "Visit" button 528 to visit the representation of the virtual environment including the barracks; and Message 530: "Andrew needs energy", accompanied by a selectable "Send" button 532 to send a virtual good in the virtual environment to the user, namely to send an "energy" virtual good in connection with the game play.

FIG. 6 illustrates another example embodiment of a game display 600 providing a game instance 602 in an online RPG, accompanied by the display of information from a plurality of social connections. Similar to FIG. 5, neighbor bar 610 may be used to provide representations of a plurality of friends, social connections, or other players in which a connection exists in the game or virtual environment. Each of the neighbor representations display a messaging indicator 611, 612, 613, 614, 615, 616 to indicate that at least one interaction message relevant to the displayed player is available for display in the message center. The messaging indicator may be provided on, or adjacent to, a representation of at least one other player in a representation of a plurality of social connections (who may be in-game connections, or gaming social network connections). Thus, interaction messages received for a plurality of social connections may be surfaced within a single interface.

FIG. 6 further illustrates the interaction with messaging indicator 615 to display a mini-view messaging center 620, such as when a user interface cursor is used to click, hover over, or otherwise select messaging indicator 615. As illustrated within messaging center 620, interaction messages displayed may include action event messages (e.g., "Help" in response to notification that the player "Placed a Flag") and non-action messages (e.g., "Visit" in response to notification that the player "unlocked their Kingdom of Lava").

FIG. 7 illustrates an example embodiment of a game display 700 of a game instance in an online RPG, accompanied by a mini-view messaging center to display interaction messages related to other users. In the illustrated example embodiment, the online RPG simulates a residential environment in which player characters can interact and perform predefined actions in their own game instances, or in the game instances of other players to whose game instances they have access, in order to increase in-game scores, achieve in-game rewards, and increase in-game experience levels or points. FIG. 7 shows an example of a virtual residence or house in an online game titled Familyville and administered by Zynga. This disclosure, however, contemplates any suitable online game in which game play includes direct or indirect interactions between friend players.

As illustrated, a player can access the game via a browser client 704, which presents the virtual environment 702 in game display 700. Game display 700 shows, for example, various player characters in a virtual house of the game instance associated with certain users within virtual environment 702. The game display 700 further includes a "friendship" bar 706 to indicate respective states of online activity conducted by plurality of connected friend players 708 (e.g., other users of the game who are social network connections). The friendship bar may also indicate the respective states of online activity conducted by teammates, neighbors, or in-game connections that are specific to the online game or game type (for connections that may or may not be social network connections). The friendship bar 706 may also serve as a navigation tool, whereby the game instance of any friend or connection (e.g., the friend's "home" virtual environment) may be visited by clicking or selecting the iconic representation of the particular friend.

Specifically, on the iconic representation 710 of friend "Phil", an indicator may be displayed in connection with the iconic representation 710 to allow an interaction message box 720 to be launched or otherwise displayed. The interaction message box 720 illustrates the display of a small number of interaction messages related to the selected friend, for example, an action event associated with an ongoing game action (Phil needs energy: Send Energy), or a non-action event not associated with an ongoing game action (Phil visited your home today: Send Thank You). In similar fashion, other types and formats of interaction messages may be provided by the interaction message box 720. Additionally, the virtual environment 702 may be configured to continue game play while the interaction message box 720 is being displayed and interacted with.

Data Flow

Figure 8:
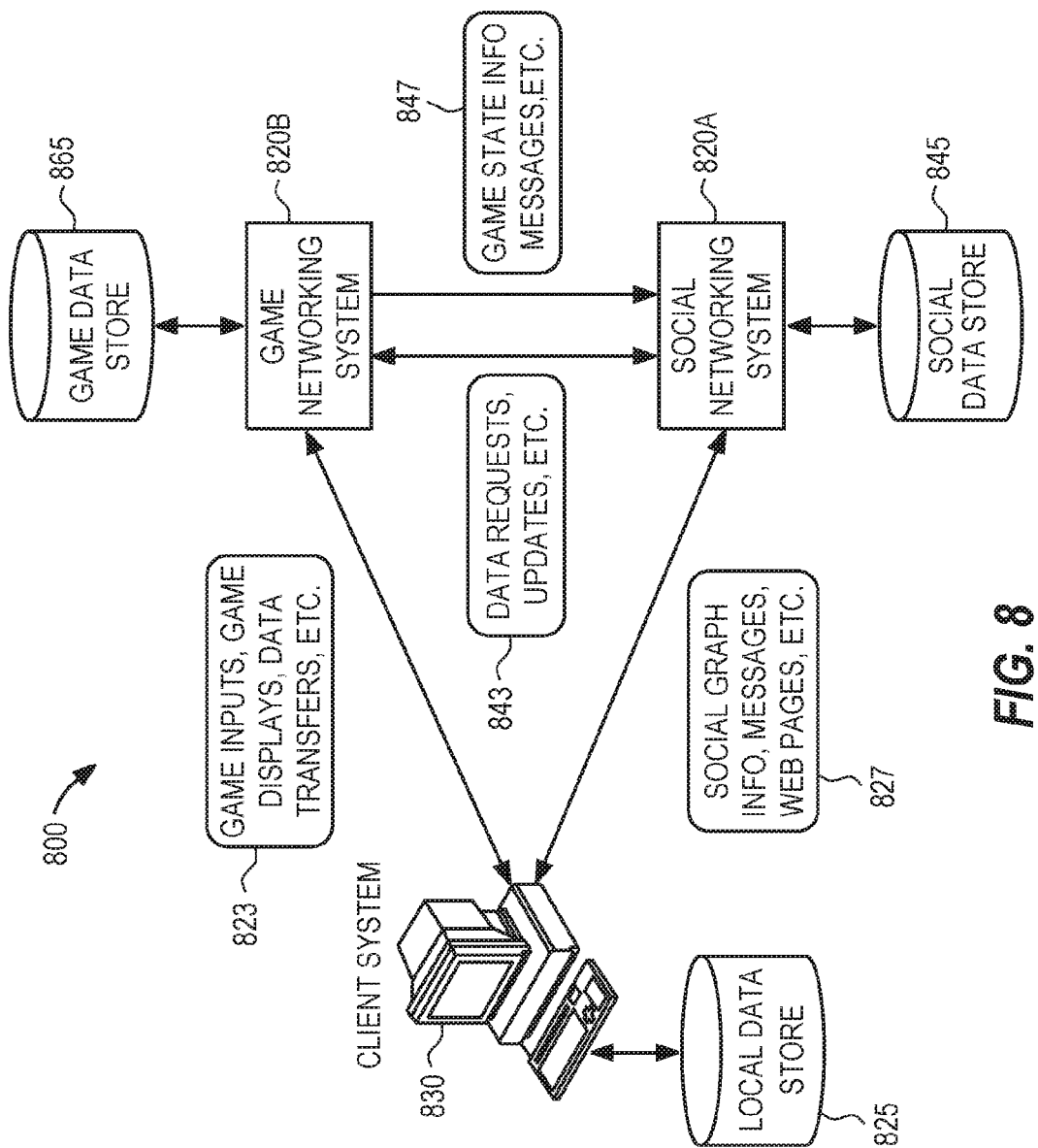
FIG. 8 illustrates an example data flow in a system.

FIG. 8 illustrates an example data flow between the components of an example system 800. In particular embodiments, system 800 can include client system 830, social networking system 820a, and game networking system 820b. A system 300 such as that described with reference to FIG. 3 may be provided by the client system 830, the social networking system 820a, or the game networking system 820b, or by any combination of these systems. The components of system 800 can be connected to each other in any suitable configuration, using any suitable type of connection. The components may be connected directly or over any suitable network. Client system 830, social networking system 820a, and game networking system 820b can each have one or more corresponding data stores such as local data store 825, social data store 845, and game data store 865, respectively. Social networking system 820a and game networking system 820b can also have one or more servers that can communicate with client system 830 over an appropriate network. Social networking system 820a and game networking system 820b can have, for example, one or more Internet servers for communicating with client system 830 via the Internet. Similarly, social networking system 820a and game networking system 820b can have one or more mobile servers for communicating with client system 830 via a mobile network (e.g., GSM, PCS, WiMAX, LTE, Wi-Fi, WPAN, etc.). In some embodiments, one server may be able to communicate with client system 830 over both the Internet and a mobile network. In other embodiments, separate servers can be used.

Client system 830 can receive and transmit data 823 to and from game networking system 820b. This data can include, for example, webpages, messages, game inputs, game displays, HTTP packets, data requests, transaction information, updates, and other suitable data. At some other time, or at the same time, game networking system 820b can communicate data 843, 847 (e.g., game state information, game system account information, page info, messages, data requests, updates, etc.) with other networking systems, such as social networking system 820a (e.g., Facebook, MySpace, Google+, etc.). Client system 830 can also receive and transmit data 827 to and from social networking system 820a. This data can include, for example, webpages, messages, social graph information, social network displays. HTTP packets, data requests, transaction information, updates, and other suitable data.

Communication between client system 830, social networking system 820a, and game networking system 820b can occur over any appropriate electronic communication medium or network using any suitable communications protocols. For example, client system 830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 820b, the BLOB containing the game state for the instance corresponding to the player can be transmitted to client system 830 for use by a client-side executed object to process. In particular embodiments, the client-side executable may be a FLASH-based game, which can de-serialize the game state data in the BLOB. As a player plays the game, the game logic implemented at client system 830 maintains and modifies the various game state parameters locally. The client-side game logic may also batch game events, such as mouse clicks, and transmit these events to game networking system 820b. Game networking system 820b may itself operate by retrieving a copy of the BLOB from a database or an intermediate memory cache (memcache) layer. Game networking system 820b can also de-serialize the BLOB to resolve the game state parameters and execute its own game logic based on the events in the batch file of events transmitted by the client to synchronize the game state on the server side. Game networking system 820b may then re-serialize the game state, now modified, into a BLOB, and pass this to a memory cache layer for lazy updates to a persistent database.

With a client-server environment in which the online games may run, one server system, such as game networking system 820b, may support multiple client systems 830. At any given time, there may be multiple players at multiple client systems 830 all playing the same online game. In practice, the number of players playing the same game at the same time may be very large. As the game progresses with each player, multiple players may provide different inputs to the online game at their respective client systems 830, and multiple client systems 830 may transmit multiple player inputs and/or game events to game networking system 820b for further processing. In addition, multiple client systems 830 may transmit other types of application data to game networking system 820b.

In particular embodiments, a computed-implemented game may be a text-based or turn-based game implemented as a series of web pages that are generated after a player selects one or more actions to perform. The web pages may be displayed in a browser client executed on client system 830. As an example and not by way of limitation, a client application downloaded to client system 830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe FLASH-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 820a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 830, either caused by an action of a game player or by the game logic itself, client system 830 may need to inform game networking system 820b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 800 is discussed in reference to updating a multi-player online game hosted on a network-addressable system (such as, for example, social networking system 820a or game networking system 820b), where an instance of the online game is executed remotely on a client system 830, which then transmits application event data to the hosting system such that the remote game server synchronizes the game state associated with the instance executed by the client system 830.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 830 may include a Flash client. The Flash client may be configured to receive and run Flash application or game object code from any suitable networking system (such as, for example, social networking system 820a or game networking system 820b). In particular embodiments, the Flash client may be run in a browser client executed on client system 830. A player can interact with Flash objects using client system 830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 830, the Flash client may send the events that caused the game state changes to the in-game object to game networking system 820b. However, to expedite the processing and hence the speed of the overall gaming experience, the Flash client may collect a batch of some number of events or updates into a batch file. The number of events or updates may be determined by the Flash client dynamically or determined by game networking system 820b based on server loads or other factors. For example, client system 830 may send a batch file to game networking system 820b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 830. In particular embodiments, the batch file may be a text file and the name-value pairs may be in string format.

In particular embodiments, when a player plays an online game on client system 830, game networking system 820b may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 820b may retrieve the corresponding BLOB from the database to determine the most-recent values of the game-related data. In particular embodiments, while a player is playing the online game, game networking system 820b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 9:
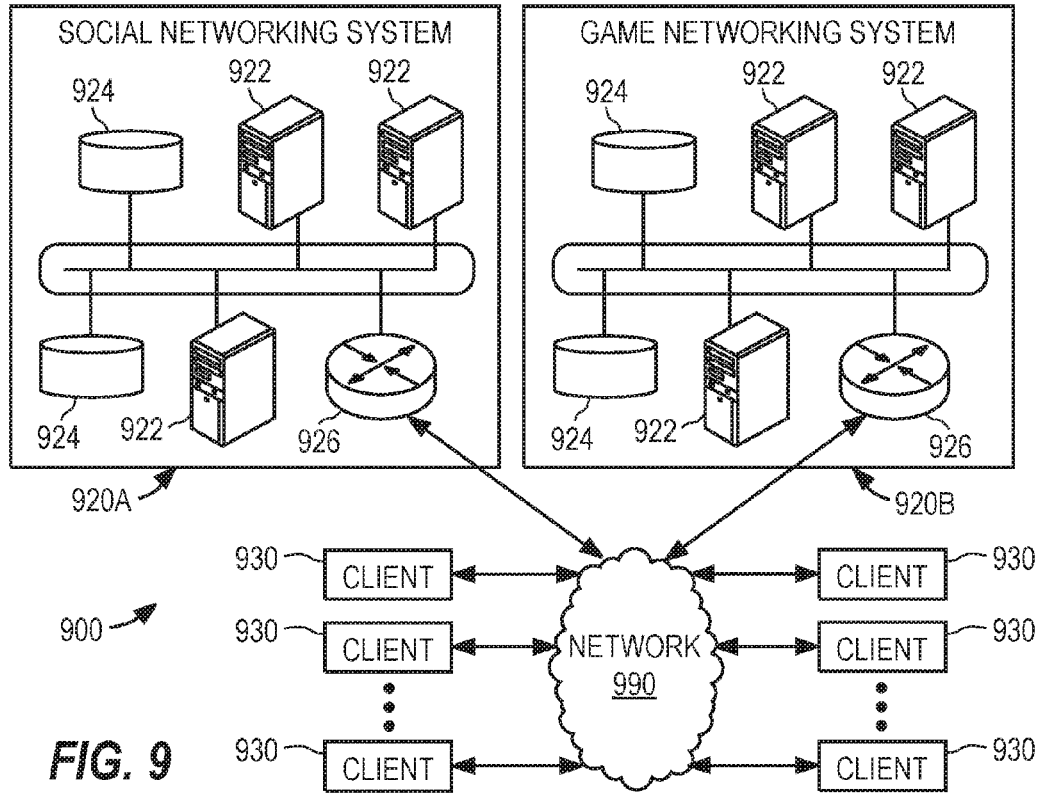
FIG. 9 illustrates an example network environment.

Particular embodiments may operate in a WAN environment, such as the Internet, including multiple network addressable systems. FIG. 9 illustrates an example network environment 900, in which various example embodiments may operate. Network cloud 960 generally represents one or more interconnected networks, over which the systems and hosts described herein, can communicate. Network cloud 960 may include packet-based WAN (such as the Internet), private networks, wireless networks, satellite networks, cellular networks, paging networks, and the like. As FIG. 9 illustrates, particular embodiments may operate in a network environment comprising one or more networking systems, such as social networking system 920a, game networking system 920b, and one or more client systems 930. The components of social networking system 920a and game networking system 920b operate analogously, as such, hereinafter they may be referred to simply at networking system 920. Client systems 930 are operably connected to the network environment via a network service provider, a wireless carrier, or any other suitable means.

Networking system 920 is a network addressable system that, in various example embodiments, comprises one or more physical servers 922 and data stores 924. The one or more physical servers 922 are operably connected to computer network 960 via, by way of example, a set of routers and/or networking switches 926. In an example embodiment, the functionality hosted by the one or more physical servers 922 may include web or HTTP servers, FTP servers, as well as, without limitation, webpages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 922 may host functionality directed to the operations of networking system 920. Hereinafter servers 922 may be referred to as server 922, although server 922 may include numerous servers hosting, for example, networking system 920, as well as other content distribution servers, data stores, and databases. Data store 924 may store content and data relating to, and enabling, operation of networking system 920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 924 corresponds to one or more of a variety of separate and integrated databases, such as relational databases and object-oriented databases, that maintain information as an integrated collection of logically related records or files stored on one or more physical systems. Structurally, data store 924 may generally include one or more of a large class of data storage and management systems. In particular embodiments, data store 924 may be implemented by any suitable physical system(s) including components, such as one or more database servers, mass storage media, media library systems, storage area networks, data storage clouds, and the like. In one example embodiment, data store 924 includes one or more servers, databases (e.g., MySQL), and/or data warehouses. Data store 924 may include data associated with different networking system 920 users and/or client systems 930.

Client system 930 is generally a computer or computing device including functionality for communicating (e.g., remotely) over a computer network. Client system 930 may be a desktop computer, laptop computer, personal digital assistant (PDA), in- or out-of-car navigation system, smart phone or other cellular or mobile phone, or mobile gaming device, among other suitable computing devices. Client system 930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 930 to enter addresses of specific network resources to be retrieved, such as resources hosted by networking system 920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 930 desires to view a particular webpage (hereinafter also referred to as target structured document) hosted by networking system 920, the user's web browser, or other document rendering engine or suitable client application, formulates and transmits a request to networking system 920. The request generally includes a URL or other document identifier as well as metadata or other information. By way of example, the request may include information identifying the user, such as a user ID, as well as information identifying or characterizing the web browser or operating system running on the user's client computing device 930. The request may also include location information identifying a geographic location of the user's client system or a logical network location of the user's client system. The request may also include a timestamp identifying when the request was transmitted.

Although the example network environment described above and illustrated in FIG. 9 is described with respect to social networking system 920*a* and game networking system 920*b*, this disclosure encompasses any suitable network environment using any suitable systems. As an example and not by way of limitation, the network environment may include online media systems, online reviewing systems, online search engines, online advertising systems, or any combination of two or more such systems.

Figure 10:
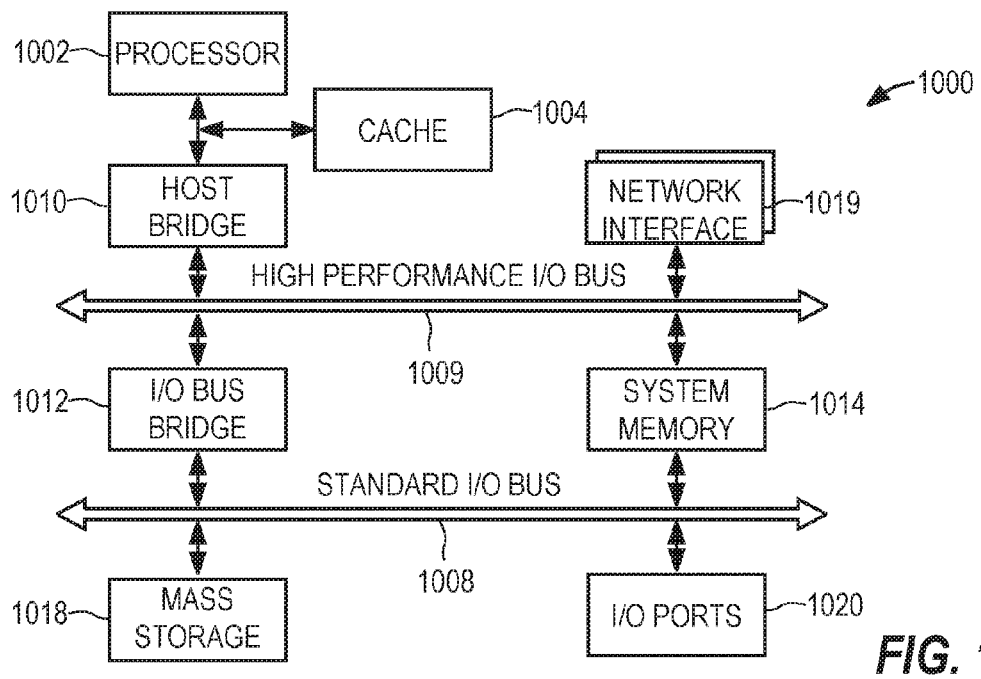
FIG. 10 illustrates an example computer system architecture.

FIG. 10 illustrates an example computing system architecture, which may be used to implement a server 922 or a client system 930. In one embodiment, hardware system 1000 comprises a processor 1002, a cache memory 1004, and one or more executable modules and drivers, stored on a tangible computer readable medium, directed to the functions described herein. Additionally, hardware system 1000 may include a high performance input/output (I/O) bus 1006 and a standard I/O bus 1008. A host bridge 1010 may couple processor 1002 to high performance I/O bus 1006, whereas I/O bus bridge 1012 couples the two buses 1006 and 1008 to each other. A system memory 1014 and one or more network/communication interfaces 1016 may couple to bus 1006. Hardware system 1000 may further include video memory (not shown) and a display device coupled to the video memory. Mass storage 1018 and I/O ports 1020 may couple to bus 1008. Hardware system 1000 may optionally include a keyboard, a pointing device, and a display device (not shown) coupled to bus 1008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1000 are described in greater detail below. In particular, network interface 1016 provides communication between hardware system 1000 and any of a wide range of networks, such as an Ethernet (e.g., IEEE 802.3) network, a backplane, and the like. Mass storage 1018 provides permanent storage for the data and programming instructions to perform the above-described functions implemented in servers 422, whereas system memory 1014 (e.g., DRAM) provides temporary storage for the data and programming instructions when executed by processor 1002. I/O ports 1020 are one or more serial and/or parallel communication ports that provide communication between additional peripheral devices, which may be coupled to hardware system 1000.

Hardware system 1000 may include a variety of system architectures and various components of hardware system 1000 may be rearranged. For example, cache 1004 may be on-chip with processor 1002. Alternatively, cache 1004 and processor 1002 may be packed together as a "processor module," with processor 1002 being referred to as the "processor core." Furthermore, certain embodiments of the present disclosure may not require nor include all of the above components. For example, the peripheral devices shown coupled to standard I/O bus 1008 may couple to high performance I/O bus 1006. In addition, in some embodiments, only a single bus may exist, with the components of hardware system 1000 being coupled to the single bus. Furthermore, hardware system 1000 may include additional components, such as additional processors, storage devices, or memories.

An operating system manages and controls the operation of hardware system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Miscellaneous

One or more features from any embodiment may be combined with one or more features of any other embodiment without departing from the scope of the disclosure.

A recitation of "a," "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., a cellular phone, smart phone, personal GPS, personal digital assistant, personal gaming device), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method of facilitating interactions among client sessions of a computer-implemented online game, the method comprising:
    establishing a messaging channel between a first client game session of a first player and a game server of computer-implemented online game, wherein the game server hosts multiple client game sessions of a game networking system;
    receiving an interaction message from the game server sent on behalf of a second player via the messaging channel, the interaction message being generated by the game server in response to an event occurring in the game networking system, wherein the interaction message includes an option to respond to the interaction message;
    generating an interaction message user interface to display in the first client game session, the interaction message user interface including the interaction message and a selectable user interface element corresponding to the option to respond to the interaction message, wherein the interaction message user interface is to be displayed until occurrence of a termination event; and
    transmitting, to the game server, a response to the received interaction message based on a user selection of the selectable user interface element, the response including commands for performing an action, by the game server, which affect a second client game session of the second player.

2. The method of claim 1, wherein the first player and the second player are connected via a social network connection of the game networking system.

3. The method of claim 1, wherein the event occurring in the game networking system is an event occurring to an in-game object of the second player in the second client game session.

4. The method of claim 1, wherein the first player and the second player are members of a group of players and the event occurring in the game networking system is an event affecting game play of the second player with respect to the group of players.

5. The method of claim 1, wherein the termination event is the user selection of the selectable user interface element.

6. The method of claim 1, further comprising:
    determining a generation time for the interaction message user interface;
    calculating a timeout time for the interaction message user interface based on the generation time; and
    identifying that the first player has not interacted with the interaction message user interface within a response window defined between the generation time and the timeout time, wherein the termination event is triggered in response to determining that the first player has not interacted with the interaction message user interface within the response window.

7. The method of claim 1, wherein generating the interaction message user interface includes displaying the interaction message to the first player as an overlay to ongoing game play of the first player in the first client game session, and wherein selection of the selectable user interface element causes display of a separate game session and performing the action pursuant to the commands in the separate game session.

8. The method of claim 7, further comprising displaying a new interaction message indicator to the first player, wherein displaying the interaction message user interface to the first player is performed in response to first player interaction with the new interaction message indicator.

9. The method of claim 8, wherein displaying the new interaction message indicator includes positioning the new interaction message indicator on or adjacent to a representation of the second player in a representation of a plurality of in-game connections.

10. The method of claim 1, wherein the interaction message user interface is provided in a player-unique display including a plurality of interaction messages, the plurality of interaction messages presenting respective options to conduct potential in-game interactions specific to the second player.

11. The method of claim 1, wherein the display of the interaction message user interface includes a plurality of interaction messages for interaction with a plurality of other players including the second player, wherein the display of the plurality of interaction messages is determined according to a time of event occurrence of the plurality of interaction messages.

12. The method of claim 1, wherein displaying the interaction message user interface to the first player includes displaying, as an overlay of a representation of the second player within a listing of in-game connections, a selectable display user interface control used to initiate the display of the interaction message user interface, wherein selection of the interaction message user interface provides for direct interaction with gameplay of the second player.

13. The method of claim 1, wherein the interaction message provides information related to in-game assistance of the second player, and wherein option for responding to the interaction message relates to an action causing the in-game assistance to occur from the first player to the second player.

14. A computing system, comprising:
    at least one processor; and
    memory including instructions for facilitating interactions among client sessions of a computer-implemented online game that, when executed by the at least one processor, cause the at least one processors to:
        establish a messaging channel between a first client game session of a first player and a game server of computer-implemented online game, wherein the game server hosts multiple client game sessions of a game networking system;
        receive an interaction message from the game server sent on behalf of a second player via the messaging channel, the interaction message being generated by the game server in response to an event occurring in the game networking system, wherein the interaction message includes an option to respond to the interaction message;

generate an interaction message user interface to display in the first client game session, the interaction message user interface including the interaction message and a selectable user interface element corresponding to the option to respond to the interaction message, wherein the interaction message user interface is to be displayed until occurrence of a termination event; and transmit, to the game server, a response to the received interaction message based on a user selection of the selectable user interface element, the response including commands for performing an action, by the game server, which affect a second client game session of the second player.

15. The computing system of claim 14, wherein the first player and the second player are members of a group of players and the event occurring in the game networking system is an event that affects game play of the second player with respect to the group of players.

16. The computing system of claim 14, the memory further comprising instructions to:

determine a generation time for the interaction message user interface;

calculate a timeout time for the interaction message user interface based on the generation time; and identify that the first player has not interacted with the interaction message user interface within a response window defined between the generation time and the timeout time, wherein the termination event is triggered in response to determining that the first player has not interacted with the interaction message user interface within the response window.

17. The computing system of claim 14, wherein the instructions to generate the interaction message user interface include instructions to:

display the interaction message to the first player as an overlay to ongoing game play of the first player in the first client game session, wherein selection of the selectable user interface element causes display of a separate game session and performance of the action pursuant to the commands in the separate game session.

18. The computing system of claim 17, the memory further comprising instructions to:

display a new interaction message indicator to the first player, wherein display of the interaction message user interface to the first player is performed in response to first player interaction with the new interaction message indicator.

19. The computing system of claim 18, wherein the instructions to display the new interaction message indicator include instructions to:

position the new interaction message indicator on or adjacent to a representation of the second player in a representation of a plurality of in-game connections.

20. A non-transitory machine readable storage medium that stores instructions which, when performed by a machine, cause the machine to perform operations that:

establish a messaging channel between a first client game session of a first player and a game server of computer-implemented online game, wherein the game server hosts multiple client game sessions of a game networking system;

receive an interaction message from the game server sent on behalf of a second player via the messaging channel, the interaction message being generated by the game server in response to an event occurring in the game networking system, wherein the interaction message includes an option to respond to the interaction message;

generate an interaction message user interface to display in the first client game session, the interaction message user interface including the interaction message and a selectable user interface element corresponding to the option to respond to the interaction message, wherein the interaction message user interface is to be displayed until occurrence of a termination event; and transmit, to the game server, a response to the received interaction message based on a user selection of the selectable user interface element, the response including commands for performing an action, by the game server, which affect a second client game session of the second player.

21. The machine readable storage medium of claim 20, wherein the first player and the second player are members of a group of players and the event occurring in the game networking system is an event that affects game play of the second player with respect to the group of players.

22. The machine readable storage medium of claim 20, further comprising instructions to:

determine a generation time for the interaction message user interface;

calculate a timeout time for the interaction message user interface based on the generation time; and identify that the first player has not interacted with the interaction message user interface within a response window defined between the generation time and the timeout time, wherein the termination event is triggered in response to determining that the first player has not interacted with the interaction message user interface within the response window.

23. The machine readable storage medium of claim 20, wherein the instructions to generate the interaction message user interface include instructions to:

display the interaction message to the first player as an overlay to ongoing game play of the first player in the first client game session, wherein selection of the selectable user interface element causes display of a separate game session and performance of the action pursuant to the commands in the separate game session.

24. The machine readable storage medium of claim 23, further comprising instructions to:

display a new interaction message indicator to the first player, wherein display of the interaction message user interface to the first player is performed in response to first player interaction with the new interaction message indicator.

25. The machine readable storage medium of claim 24, wherein the instructions to display the new interaction message indicator include instructions to:

position the new interaction message indicator on or adjacent to a representation of the second player in a representation of a plurality of in-game connections.

* * * * *

UNITED STATES PATENT AND TRADEMARK OFFICE
CERTIFICATE OF CORRECTION

PATENT NO. : 9,895,609 B2
APPLICATION NO. : 15/625037
DATED : February 20, 2018
INVENTOR(S) : Miller et al.

It is certified that error appears in the above-identified patent and that said Letters Patent is hereby corrected as shown below:

On the Title Page

Page 2, Column 2, item [56], under "Other Publications", Line 19, delete "sto" and insert --to-- therefor In the Drawings Drawing sheet 1 of 9, FIG. 1, reference numeral 120A, delete "120A" and insert --140-- therefor Drawing sheet 1 of 9, Fig. 1, reference numeral 120B, delete "120B" and insert --150-- therefor Drawing sheet 4 of 9, Fig. 4, reference numeral 410, Line 2, delete "GAMES(S)" and insert --GAME(S)-- therefor Drawing sheet 9 of 9, Fig. 9, reference numeral 990, Line 2, delete "990" and insert --960-- therefor Drawing sheet 9 of 9, Fig. 10, reference numeral 1019, delete "1019" and insert --1016-- therefor Drawing sheet 9 of 9, Fig. 10, reference numeral 1009, delete "1009" and insert --1006-- therefor In the Specification Column 3, Line 57, delete "120" and insert --140-- therefor Column 9, Line 13, delete "Friend 11" and insert --Friend $1_1$-- therefor Column 9, Line 13, delete "Friend 21" and insert --Friend $2_1$-- therefor Column 9, Lines 21-22, delete "Friend 12" and insert --Friend $1_2$-- therefor Signed and Sealed this
Twenty-first Day of April, 2020

Andrei Iancu
*Director of the United States Patent and Trademark Office*

CERTIFICATE OF CORRECTION (continued)
U.S. Pat. No. 9,895,609 B2

Column 9, Line 22, delete "Friend 22" and insert --Friend $2_2$-- therefor

Column 9, Line 23, delete "Friend 11" and insert --Friend $1_1$-- therefor

Column 9, Line 31, delete "Friend 1N" and insert --Friend $1_N$-- therefor

Column 9, Line 32, delete "Friend 32" and insert --Friend $3_2$-- therefor

Column 9, Line 44, delete "Friend 11" and insert --Friend $1_1$-- therefor

Column 9, Line 44, delete "Friend 21" and insert --Friend $2_1$-- therefor

Column 9, Lines 47-48, delete "Friend 21" and insert --Friend $2_1$-- therefor

Column 9, Line 48, delete "Friend 31" and insert --Friend $3_1$-- therefor

Column 9, Line 48, delete "Friend 41" and insert --Friend $4_1$-- therefor

Column 9, Line 52, delete "Friend 21" and insert --Friend $2_1$-- therefor

Column 9, Line 54, delete "Friend 21" and insert --Friend $2_1$-- therefor

Column 9, Line 63, delete "Friend 22" and insert --Friend $2_2$-- therefor

Column 9, Line 64, delete "Friend 22" and insert --Friend $2_2$-- therefor

Column 15, Line 48, delete "Send Energy)," and insert --Send Energy);-- therefor Column 20, Line 2, delete "analogously," and insert --analogously;-- therefor Column 22, Line 25, delete "422," and insert --922,-- therefor